(12) United States Patent
Denmead et al.

(10) Patent No.: US 11,904,559 B2
(45) Date of Patent: Feb. 20, 2024

(54) SHAPED PREFORM FOR SPOKE PORTION OF A COMPOSITE WHEEL

(71) Applicant: CARBON REVOLUTION LIMITED, Waurn Ponds (AU)

(72) Inventors: Ashley James Denmead, Belmont (AU); Michael Dunbar Silcock, Wallington (AU); Timothy Corbett, Highton (AU); Nicholas Taylor, Waurn Ponds (AU); Steven Agius, Belmont (AU); Barry Trippit, Glen Iris (AU)

(73) Assignee: Carbon Revolution Limited, Victoria (AU)

( * ) Notice: Subject to any disclaimer, the term of this patent is extended or adjusted under 35 U.S.C. 154(b) by 757 days.

(21) Appl. No.: 16/639,501

(22) PCT Filed: Aug. 17, 2018

(86) PCT No.: PCT/AU2018/050878
§ 371 (c)(1),
(2) Date: Feb. 14, 2020

(87) PCT Pub. No.: WO2019/033175
PCT Pub. Date: Feb. 21, 2019

(65) Prior Publication Data
US 2020/0406674 A1    Dec. 31, 2020

(30) Foreign Application Priority Data
Aug. 18, 2017    (AU) .............................. 2017903324

(51) Int. Cl.
*B29C 70/86*    (2006.01)
*B29C 70/30*    (2006.01)
(Continued)

(52) U.S. Cl.
CPC ............ *B29C 70/865* (2013.01); *B29C 70/30* (2013.01); *B60B 3/004* (2013.01); *B60B 3/02* (2013.01);
(Continued)

(58) Field of Classification Search
CPC .... B60B 3/10; B60B 3/02; B60B 5/02; B60B 7/061; B60B 2310/204; B60B 2360/36;
(Continued)

(56) References Cited

U.S. PATENT DOCUMENTS 4,302,155 A    11/1981    Grimes et al.
5,564,793 A    10/1996    Whiteford
(Continued)

FOREIGN PATENT DOCUMENTS

JP    S61-095907 A    5/1986
JP    S61-135801 A    6/1986
(Continued)

OTHER PUBLICATIONS

Translation of JP 2017007382 A , 7 pages (Year: 2017).*

*Primary Examiner* — S. Joseph Morano
*Assistant Examiner* — Emily G. Castonguay
(74) *Attorney, Agent, or Firm* — Buchanan Ingersoll & Rooney PC

(57) ABSTRACT

A shaped preform component (200A) for a spoke portion (108A) of a composite wheel (100), the shaped preform (200A) comprising: an elongate body (215) configured to be located in a spoke (108) of a composite wheel (100), wherein the shaped preform component (200A) is formed from a cured composite fibre material having a compressibility of <2% volumetric under moulding conditions of 50 bar hydrostatic pressure and a temperature of 60 to 150° C., and wherein the density of the cured composite fibre mate-
(Continued)

rial is selected to form a counterbalance mass for a mass addition (300) to the composite wheel (100).

20 Claims, 4 Drawing Sheets

(51) Int. Cl.

| | | |
|---|---|---|
| *B60B 3/10* | (2006.01) | |
| *B60B 7/06* | (2006.01) | |
| *B60B 3/00* | (2006.01) | |
| *B60B 3/02* | (2006.01) | |
| *B60B 5/02* | (2006.01) | |
| *B29L 31/32* | (2006.01) | |
| *C08K 3/04* | (2006.01) | |
| *C08K 3/36* | (2006.01) | |
| *C08K 7/06* | (2006.01) | |
| *C08K 7/28* | (2006.01) | |
| *C08L 63/00* | (2006.01) | |
| *B29K 307/04* | (2006.01) | |

(52) U.S. Cl.
 CPC ................ *B60B 3/10* (2013.01); *B60B 5/02* (2013.01); *B60B 7/061* (2013.01); *C08K 3/04* (2013.01); *C08K 3/36* (2013.01); *C08K 7/06* (2013.01); *C08K 7/28* (2013.01); *C08L 63/00* (2013.01); *B29K 2307/04* (2013.01); *B29L 2031/32* (2013.01); *B60B 2310/204* (2013.01); *B60B 2310/52* (2013.01); *B60B 2360/346* (2013.01); *B60B 2360/36* (2013.01)

(58) Field of Classification Search
 CPC .......... B60B 2360/346; B29L 2031/32; B29C 70/30; B29C 70/865; F16F 15/324; F16F 15/326
 See application file for complete search history.

(56) References Cited

U.S. PATENT DOCUMENTS

| | | |
|---|---|---|
| 5,647,642 A | 7/1997 | Word |
| 6,312,059 B1 | 11/2001 | Stach |
| 7,681,958 B1 | 3/2010 | Bagdasarian |
| 2005/0121970 A1 | 6/2005 | Adrian |
| 2013/0026816 A1 | 1/2013 | Kia et al. |
| 2014/0292026 A1 | 10/2014 | Salvaggio, Jr. |
| 2015/0231917 A1 | 8/2015 | Dressler et al. |
| 2015/0328922 A1* | 11/2015 | Dingle ............... B32B 5/12 156/60 |
| 2015/0360509 A1 | 12/2015 | Werner et al. |
| 2015/0367676 A1* | 12/2015 | Hendel ................ B60B 3/10 301/63.107 |
| 2016/0193869 A1 | 7/2016 | Renner et al. |
| 2016/0288563 A1* | 10/2016 | Fukudome ........... B60B 3/008 |
| 2019/0389245 A1* | 12/2019 | Bedeschi ............. B60B 3/10 |
| 2020/0406671 A1 | 12/2020 | Denmead et al. |

FOREIGN PATENT DOCUMENTS

| | | | |
|---|---|---|---|
| JP | H02-057401 A | 2/1990 | |
| JP | 2017007382 A * | 1/2017 | ............ B60B 5/02 |
| WO | WO-2010/024495 A1 | 3/2010 | |
| WO | WO-2010/025495 A1 | 3/2010 | |
| WO | WO-2013/083729 A2 | 6/2013 | |
| WO | WO-2014/016211 A1 | 1/2014 | |
| WO | WO-2015/158780 A1 | 10/2015 | |
| WO | WO-2014/165895 A9 | 12/2016 | |
| WO | WO-2019/033173 A1 | 2/2019 | |

\* cited by examiner

SHAPED PREFORM FOR SPOKE PORTION OF A COMPOSITE WHEEL

CROSS-REFERENCE TO RELATED APPLICATIONS

The present application is a U.S. National Stage of International Application No. PCT/AU2018/050878, filed Aug. 17, 2018, which claims priority from Australian Provisional Patent Application No. 2017903324, filed Aug. 18, 2017, the contents of which should be understood to be incorporated into this specification by this reference.

TECHNICAL FIELD

The present invention generally relates to a shaped preform for use in the production of a spoke portion of a composite wheel. The invention is particularly applicable to composite carbon fibre wheels for vehicles and/or aeroplanes and it will be convenient to hereinafter disclose the invention in relation to that exemplary application. However, it is to be appreciated that the invention is not limited to that application and could be used as a production aid in of a large variety of composite type wheels.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Tyre pressure monitoring systems (TPMS) allows the real time monitoring of the air pressure in pneumatic tyres that are mounted on a vehicle wheel. TPMS systems include a TPMS valve mounted in the vehicle wheel. However, the addition of a TMPS valve to a wheel can create a static mass imbalance in overall wheel assembly due to the additional unbalanced mass the valve can add onto one side of the wheel.

This imbalance can be addressed through the addition of adhesive or mechanically fastened wheel weights to the wheel (typically about the rim of the wheel) or through selective material removal in wheels made of isotropic materials, for example metal or metal alloy wheels, in locations on that wheel that counterbalances the mass addition. However, the use of wheel weights may upset the required visual aesthetics of certain wheel configurations. Furthermore, balancing wheels through material removal is not a viable solution for composite wheels, such as carbon fibre wheels, as the removal of material can damage the structural integrity of the composite wheel.

It would therefore be desirable to provide a new balancing and/or counterbalancing arrangement for composite wheels that can be configured to counter any unbalanced mass additions made to a composite wheel.

SUMMARY OF THE INVENTION

The present invention provides a preformed shaped insert for fitment into the fibre layup of the spoke portion (which forms part of the face portion) of a composite wheel, preferably a carbon fibre wheel for a vehicle.

The present invention provides in a first aspect, a shaped preform component for a spoke portion of a composite wheel, the shaped preform comprising:

an elongate body configured to be located in a spoke of a composite wheel, wherein the shaped preform component is formed from a cured composite fibre material having a compressibility of <2% volumetric under moulding conditions of 50 bar hydrostatic pressure and a temperature of 60 to 200° C., and wherein the density of the cured composite fibre material is selected to form a counterbalance mass for a mass addition to the composite wheel.

In embodiments, the mass addition comprises an unbalanced mass addition to the wheel, preferably a non-composite, non-carbon fibre mass addition. In exemplary embodiments, the mass addition comprises a valve, preferably a tyre pressure monitoring valve.

It should be understood that the term "composite" herein denotes any type of composite material comprising fibres, cured or uncured, irrespective of the structure being layered or not. Furthermore, pre-forms and pre-consolidated pre-forms cured or uncured are important subgroups of composite materials and bodies.

It should also be understood that the term "cured" in "cured composite fibre material" indicates that the composite fibre material has undergone at least a partial curing process to harden, cure or set a curable matrix material in the composite fibre material.

A composite wheel, for example as taught in the Applicant's international patent publication No. 2014/165895A9, generally includes two main sections, a rim portion and a face portion. The rim portion comprises an annulus structure configured to receive and seat a tyre. The face portion includes a hub which is used to fix the wheel to the vehicle, and a spoke connection structure which includes a series of spokes portions which extends between and interconnects the hub and the rim. Lateral, vertical and torsional loads are transmitted through the tyre to the rim portion of the wheel which then produce bending and torsional stresses in the connection structure.

The spoke portions of the Applicant's composite wheels have previously incorporated a shaped foam preform material. This conventional shaped preform is comprised of an isotropic foam material that is formed into rigid or semi-rigid foam body. The density of such a foam preform cannot be easily modified without adding additional weighted inserts or portions into or around the comprising foam material. Moreover, these foam preforms are typically at least semi-compressible and have a surface that is formed from materials that have limited compatibility with the surrounding composite material.

The present invention provides a shaped preform that can be used in a layup and moulding process for forming a spoke portion of a composite wheel that can be formed with a tailored density. The mass of the shaped preform can therefore be designed to fit the mass requirements of a specific spoke or spokes in the composite wheel. This tailored density is achieved through variation of the composite composition of the preform (as described in more detail below), and more particularly the filler material used in the composite composition. The composite composition can then be selected to provide a density and thus mass suitable to counterbalance a mass addition to the comprising composite wheel. One particular application is as a counterbalance for a TPMS valve fitted to the composite wheel.

The shaped preform according to the present invention is intended to form a direct substitute for conventional foam inserts used in the layup of a spoke portion of a composite wheel. No special considerations in wheel manufacturing therefore need to be made when using this new insert, as it becomes a direct substitution for the conventional foam core insert in existing wheel manufacturing processes (layup, moulding etc.).

The shaped preform component can occupy any amount of the space of a spoke of a composite wheel. In some embodiments, the shaped preform component is designed to occupy the entire volume. In other embodiments, the shaped preform component can occupy a portion of the core volume of a spoke. Where the shaped preform component occupies a portion of the volume of the spoke, another preform for example a foam component may be used in conjunction with the invention to fill that volume.

The spoke insert is formed from a composite material to allow for complex moulding and to provide a match to the composite composition of the composite wheel therefore giving the preform similar thermal and expansion properties as the surrounding composite layup material of the composite wheel. Additionally, the use of composite material avoids the use of metallic materials thereby avoiding X-ray inspection image distortion during manufacturing quality assurance testing. This composite composition also provides the ability to adjust the mechanical properties of the spoke insert for different applications. More particularly, the density of the spoke insert can be variable through filler material adjustment to provide a desired mass suitable to counterbalance a mass addition to the composite wheel in which the shaped preform is intended form part of. Additionally, the spoke insert is a better match for the spoke structure in terms of coefficient of thermal expansion, so places less stress on the composite when heated. Excess stress can lead to debonding of the preform from the surrounding carbon fibre material.

The shaped preform can be formed from any number of different materials that includes or can be bound by a curable matrix material, for example a resin to form the cured composite fibre material. Again, the particular selection of materials for the composition of the shaped preform is made to provide the shaped preform with a particular tailored density. Depending on the application, the density can be tailored to be between 0.3 and 3.0 g/cm$^3$, preferable between 0.3 and 2.0 g/cm$^3$, and more preferably from 0.4 to 1.8 g/cm$^3$. In some embodiments, the density of the shaped preform is from 0.5 and 1.5 g/cm$^3$. In some embodiments, the density of the shaped preform is from 0.4 and 1.2 g/cm$^3$. In some embodiments, the density of the shaped preform is from 0.8 and 1.6 g/cm$^3$. In some embodiments, the density of the shaped preform is from 0.4 and 1.5 g/cm$^3$. In some embodiments, the density of the shaped preform is from 1.0 and 1.8 g/cm$^3$. In some embodiments, the density of the shaped preform is from 0.4 and 1.0 g/cm$^3$. The composition is typically selected as follows:

In some embodiments, the shaped preform is formed from resin (pure resin) or is substantially formed from resin only.

In some embodiments, the shaped preform is formed from at least one of: Tailored Fibre Placement plies or preforms; One or more layers of single fibre direction plies (Unidirectional); One or more layers of multi directional fibre plies (e.g. stitched Non-crimp fabric); or Fibre Patch Placement (FPP) preforms e.g. CEVOTECH technology.

In some embodiments, the shaped preform is formed from: at least one layer of non-woven, isotropic or anisotropic fibres for example RECATEX® Recycled Carbon Fiber Nonwovens; an isotropic fibre arrangement; an orthotropic fibre arrangement; fillers; glass microspheres, preferably hollow glass microspheres; ceramic microspheres; barium sulfate; hydrophobic fumed silica; epoxy resin/hardener; phenolic resin; milled carbon fibre; comminuted carbon fibre (for example chopped or cut carbon fibre) or a combination thereof.

In preferred embodiments, the shaped preform component is formed from at least one of:

(i) a mixture of resin, milled carbon fibre and hollow glass microspheres;

(ii) a mixture of resin, comminuted carbon fibre and hollow glass microspheres;

(iii) a mixture of resin, and hollow glass microspheres;

(iv) a mixture of resin and milled carbon fibres;

(v) a mixture of resin and comminuted carbon fibres;

(vi) a mixture of resin, milled carbon fibre and solid ceramic microspheres;

(vii) a mixture of resin, comminuted carbon fibre and solid ceramic microspheres;

(viii) a mixture of resin and solid ceramic microspheres; or (ix) substantially resin only.

In exemplary embodiments, the shaped preform component is formed from at least one of:

(x) a mixture of resin, milled carbon fibre and hollow glass microspheres;

(xi) a mixture of resin, and hollow glass microspheres;

(xii) a mixture of resin and milled carbon fibres.

In the above compositions (i) to (xiii), the resin preferably comprises a mixture of resin and resin hardener. Furthermore, the composition can optionally further includes from 1 to 5 wt %, preferably from 1 to 2 wt % hydrophobic fumed silica. In other embodiments, the composition can optionally include from 2 to 5 wt %, preferably from 2 to 3 wt % hydrophobic fumed silica.

It should be appreciated that any suitable milled carbon fibre could be used. In some embodiments, the milled carbon fibres have a length of <500 micron length, preferably less than 100 micron. For example, a milled carbon fibre of 100 micron length could be used such as Carbiso™ MF. However, it should be appreciated that any brand of milled carbon fibre could be suitable. Other fibre types of similar length could be used.

In other embodiments, a comminuted carbon fibre can be used, for example a chopped carbon fibre. This comminuted carbon fibre can have a length less than 20 mm, preferably less than 15 mm, more preferably between 1 and 15 mm. For example, a comminuted carbon fibre of about 12 mm length could be used. Other fibre types of similar length could be used.

The preferred material is a mixture of mixed resin & hardener, hollow glass microspheres, Milled Carbon fibre and Hydrophobic fumed silica in a following ratio adequate mass to offset the proposed imbalance in the wheel assembly caused by the mass addition. In some embodiments, the composition mixture ratio (in parts by mass can be):

| Mix Ratio by parts | Mixed Resin & Hardener | Milled Carbon Fibre | Comminuted Carbon Fibre | Hollow Glass Microspheres | Solid Ceramic Microspheres | Theoretical Density (g/cc) |
|---|---|---|---|---|---|---|
| Option A | 100 | 0 | 0 | 100 | 0 | 0.45 |
| Option B | 300 | 0 | 0 | 110 | 0 | 0.63 |
| Option C | 375 | 100 | 0 | 56 | 0 | 0.91 |
| Option D | 100 | 0 | 0 | 0 | 0 | 1.14 |
| Option E | 200 | 100 | 0 | 0 | 0 | 1.30 |
| Option F | 100 | 0 | 0 | 0 | 200 | 1.79 |
| Option G | 200 | 0 | 100 | 0 | 0 | 1.30 |

The comminuted Carbon Fibre of Option G preferably comprises 12 mm length chopped carbon fibre.

Each of the above options (Options A to G) can further include 1 to 5 wt %, preferably 1 to 2 wt % hydrophobic fumed silica.

Whist the above options (A to G) provide specific examples of compositions and resulting theoretical densities, it should however be appreciated that other and alternative mix ratios and materials may also provide a desired tailored density.

In an exemplary embodiment, the shaped preform component is formed from a material comprising a mixture of ratio (parts by mass) of 3.75:1:0.56 Mixed Resin:Milled carbon fibre:Hollow Glass Microspheres. In embodiments, the ratio (parts by mass) of Mixed Resin:Milled carbon fibre is from 2.5:1 to 5:1, preferably between 3:1 to 4:1. In embodiments, the ratio (parts by mass) of Milled carbon fibre:Hollow Glass Microspheres is from 1:0.4 to 1:0.7, preferably between 1:0.5 to 1:0.6.

A variety of suitable hollow glass microspheres could be used in the composition of the shaped preform. The hollow glass microspheres preferably comprise hollow glass spheres having thin walls. The hollow glass microspheres can be formed from a variety of glass materials, including (but not limited to) Soda-lime borate silicate glass. The softening temperature of the hollow glass microspheres are preferably at least 500° C., more preferably at least 600° C., yet more preferably about 600° C. The hollow glass microspheres preferably have a size of from 10 to 200 microns, more preferably from 18 to 65 microns. Furthermore, the hollow glass microspheres preferably have a target crush strength (90% survival) of from 250 to 28000 psi, more preferably from 250 to 6000 psi, and yet more preferably from 250 to 3000 psi. Additionally, the hollow glass microspheres preferably have a true density of 0.125 to 0.60 g/cc, preferably from 0.125 to 0.4 g/cc, and yet more preferably from 0.125 to 0.28 g/cc. In one exemplary embodiment, the hollow glass microspheres comprise 3M S28HS glass bubbles (available from 3M Advanced Material Division) that have an average diameter of 30 micron and a crush strength (90% survival by volume) of 3000 psi and a true density of 0.28 gram per cc. However, it should be appreciated that other similar microspheres could also be used. For example, alternative hollow microspheres such as the 3M K1 bubble having a 250 PSI target crush strength and 0.125 gram per cc true density) or 3M IM30K (or similar) that has a crush strength of 28000 psi and a true density of 0.60 g/cc could be used.

Where fibre based materials are used, the shaped preform can be formed from at least one of: fibre layers, fibre plies, prepregs, semi-pregs, woven or non-woven fabrics, mats, preforms, pre-consolidated pre-forms, individual or groups of fibres, tows, or tow-pregs.

It is to be understood that prepreg refers to a substantially or fully impregnated collection of fibres, fibre tows, woven or non-woven fabric or the like. Similarly, it is to be understood that semi-preg refers to a partially impregnated collection of fibres or fibre tows. The partial impregnation provides for enhanced removal of gas through or along the dry fibres during consolidation and/or curing. An example of a semi-preg is a partially impregnated layer of fibres.

It is to be understood that woven and non-woven fabrics are collections of individual fibres or fibre tows which are substantially dry, i.e. not impregnated by a matrix material, such as resin. It should also be understood that fibre tows are bundles of a large number of individual fibres, for example 1000's, 10000's or 100000's of fibres. Tow-pregs are at least partially impregnated fibre tows.

A wide variety of fibres may be used in the present invention, including but not limited to fibres selected from the group consisting of carbon fibres, glass fibres, aramid fibres, synthetic fibres such as acrylic, polyester, PAN, PET, PE, PP or PBO-fibres, or the like, bio fibres such as hemp, jute, cellulose fibres, or the like, mineral fibres for example Rockwool or the like, metal fibres for example steel, aluminium, brass, copper, or the like, boron fibres or any combination of these. In a preferred embodiment, the fibres comprise carbon fibres. The fibres may be provided in any desirable orientation in the transition zone like for example unidirectional, biaxial or random or a combination of these. However, the fibres are preferably oriented to reduce the stress between the composite members as well as to strengthen areas of the final structure which will be exposed to a higher stress during service. The orientation of fibres may or may not be the same in all the layers comprising fibres within the transition zone. For example, one or more layers of fibres may be oriented in another manner than other layers, if a stress analysis suggests a multi-axial fibre orientation. However, in other embodiments the fibres may be oriented substantially the same way in all the layers of fibres.

It should be appreciated that the shaped preform component should be formed of a material that that ensures minimum volumetric change when used in forming the face portion of a composite wheel. Where that material comprises fibre arrangements (for example isotropic fibre arrangements), fibre layers, fibre plies, prepregs, semi-pregs, woven or non-woven fabrics, mats, preforms, pre-consolidated pre-forms, individual or groups of fibres, tows, or tow-pregs, that material is preferably processed to provide the requisite compressibility properties, and thus minimum volumetric change in subsequent processing steps.

The cured composite fibre material provides structural rigidity and/or solidity to the preform, which can be utilised to retain the designed configuration of that preform in the shape and form of the overall composite wheel. The shaped preform is designed to have limited compressibility to enable the provision of an appropriate volume and minimal volume change during layup and moulding of the face portion of the composite wheel. Use of the shaped preform of the present invention in the layup of a spoke portion of a composite wheel therefore minimises and more preferably avoids undesirable dimensional and volume changes that could damage the structure of the moulded composite wheel. It should be appreciated that the compressibility of the shaped preform is a % volumetric measurement under moulding conditions of 50 bar hydrostatic pressure (for example during resin injection) and a process temperature range of 60 to 200° C. during a resin moulding process, such as a resin transfer moulding (RTM) process.

The process temperature during molding conditions can vary depending on the preferred injection and cure temperature. The preferred process temperature is about 120° C. (typically 120° C.+/−3 C). However, the process temperature can be in the range 60 to 180° C., preferably 60 to 150° C., more preferably 60 to 140° C. In embodiments, the process temperature is from 100 to 200° C., preferably 100 to 150° C., more preferably 100 to 130° C. In embodiments, the process temperature is from 110 to 150° C., preferably 110 to 130° C.

The mechanical properties of the shaped preform of the present invention can be tailored to a desired application. As outlined above, the compressibility of the composite fibre body must be <2% volumetric under moulding conditions of 50 bar hydrostatic pressure. In some embodiments, the compressibility of the shaped preform is <1.5%, preferably <1% volumetric under moulding conditions of 50 bar hydrostatic pressure. The process temperature of moulding conditions is the same as indicated previously.

Other mechanical properties of the shaped preform of interest include:

Tensile Strength—which is preferably between 20 and 80 MPa, more preferably from 20 and 60 MPa; and Stiffness—which is preferably from 1.5 to 30 GPa, preferably from 5 to 30 GPa, more preferably from 8 to 30 GPa, yet more preferably 10 to 25 GPa. In some embodiments, the stiffness is from 1.5 to 10 GPa. In other embodiments, the stiffness is from 8 to 25 GPa. In some embodiments, the stiffness is from 2 to 30 GPa, preferably from 10 to 25 GPa.

The surface of the shaped preform preferably has a roughened surface having a roughness of at least Ra=0.2 µm. This surface roughness assists the shaped preform to bond with the surrounding material of the hub portion of a composite wheel when placed in the fibre layup of that hub portion. The roughened surface can be formed by any suitable means. In some embodiments, the roughened surface comprises a chemically etched surface, mechanically abraded surface or specially textured surface.

The thermal expansion properties of the shaped preform is preferably designed to be similar, preferably substantially match the thermal expansion properties of the overall composite material of the face portion of a composite wheel that the shaped preform is configured to be included therein. Similar or substantially matched thermal expansion properties of the shaped preform and the surrounding material (typically a laminate) avoid material damage such as delamination at the surface of the shaped preform during a post cure process. The thermal performance (and mechanical properties) of the shaped preform therefore matches the surrounding wheel structure.

The method of formation of the shaped preform typically involves the following general steps:
laying up or otherwise forming the desired shape of the shaped preform with the selected composite fibre material in a cooperatively shaped mould;
providing a matrix material in contact with the laid up material in the mould to form a matrix material introduced body; and
curing the matrix introduced body.

The laid up material is typically infused with the matrix material so that that matrix material permeates through the material. The shaped preform therefore typically further comprises a curable matrix material enveloping the comprising components of the shaped preform. Once moulded and formed into the shaped preform, the shaped preform includes a matrix material which binds the fibres and other comprising material together. During lay-up (preparing up to the point before consolidation and/or setting, curing or the like of the matrix material), the matrix material need not be comprised in the layers which include the fibres (e.g. a prepreg or semi-preg) or between the layers comprising fibres. However, the matrix material should form a continuous matrix after setting occurs. Suitable matrix material can be selected from (but are not limited to) a resin based on unsaturated polyester, polyurethane, polyvinyl ester, epoxy, allows for the molding of a shaped preform having a complex geometry.

It should be appreciated that the curing step can be controlled to provide desired mechanical properties, including stiffness and compressibility. The mechanical properties of the shaped preform can be designed to suit a particular application. These properties can be varied through selection of the constituent materials forming the shaped preform, the matrix material, amount of matrix material injected or included therein, and the cure regime (cure time, temperature, whether the body is fully cured). In some instances it is desirable to stop the curing process before the shaped preform is fully cured, so as to produce surface properties which assist the adherence of subsequent layup material when used in the layup of the face portion of a composite wheel.

Advantageously, the surface of the shaped preform is preferably designed to adhere to the rest of material and structure used to form the composite wheel. In embodiments, the surface of the shaped preform is configured to assist adherence of carbon fibre or material including carbon fibre thereon. As described above, the surface of the shaped preform preferably has a roughened surface having a roughness of at least Ra=0.2 µm. The roughened surface can be formed by any suitable means. In some embodiments, the roughened surface comprises a chemically etched surface, a mechanically abraded surface or a mechanically featured surface.

The surface properties of the shaped preform can be modified through altering the curing properties and regime of the shaped preform. In some embodiments, the shaped preform comprises an incomplete or under-cured preform. However, again it must be appreciated that the shaped preform is cured and otherwise processed to provide a selected compressibility that provides minimum volumetric change in subsequent fibre layup and moulding processing steps. The filler material and resin are preferably injectable into a mould prior to cure.

The shaped preform is typically formed with a designed shape and geometry which provides a basis for forming the geometry (in some cases complex geometry) of the spoke portion of the required composite wheel. A spoke or spoke portion of a composite wheel generally extends along a centreline extending radially from a central axis of the composite wheel. The shaped preform follows that shape, and typically forms an elongate body which is configured to extend along a centreline extending radially from a central axis of the composite wheel.

The spoke portion of a composite wheel can have any suitable configuration. In embodiments, the spoke portion comprises a generally cuboid or rectangular box shaped body. That body preferably includes at least two arms extend laterally outwardly one end of the elongate body, preferably having an end face configured to complement the contours and shape of the proximate or adjoining surfaces of the hub portion of the comprising composite wheel. That body also preferably includes at least one L-shaped end extending axially outwardly one end of the elongate body, preferably having an end face configured to complement the contours and shape of the proximate or adjoining surfaces of the rim portion of the comprising composite wheel.

The shaped preform can additionally include a number of features designed to assist subsequent formation and layup of a face portion of a composite wheel. These features include (but are not limited to):
 fibre ply retention formations;
 guide lines to visually indicate the location that the edges of a ply should be located; or
 holding/manipulation formations for optimising handling of the shaped preform.

The present invention provides in a second aspect, a method of forming a face portion of a composite fibre wheel, comprising:
 locating a shaped preform according to any one of the preceding claims in the spoke portion of the fibre layup of a face portion of a composite wheel in a position suitable to balance a mass addition about the central axis of the face portion of the composite wheel; and
 laying up composite fibre elements around the shaped preform thereby forming a pre-moulded structure of the spoke portion of a composite fibre wheel.

The shaped preform can be placed in one or more spoke portions of the face portion lay up of a composite fibre any position suitable to balance the mass addition about the central axis of the face portion of the composite wheel. Typically, this location would be in a generally radially opposite location to the location of the mass addition. However, in some embodiments, the shaped preform may be designed to be positioned on the same side, in line with the mass addition about the central axis. For example, where that mass addition comprises valve, such as a TPMS valve, the shaped preform is located in a spoke portions located generally radially opposite to the valve location on the composite wheel.

The shaped preform, fibres and fibre elements of the fibre layup of the face portion are preferably injected and/or impregnated with matrix material and then cured, set or the like. The face portion therefore preferably further comprises a matrix material enveloping the fibre layup and comprising fibres and fibre elements. Any suitable matrix material can be used. In some embodiments, a resin is used. The resin is preferably based on unsaturated polyester, polyurethane, polyvinyl ester, epoxy, thermoplastics, similar chemical compounds or combinations thereof. In a preferred embodiment, the resin is epoxy-based. In other embodiments, the matrix material comprises a metal matrix, forming a composite metal matrix with the fibres when set. The metal matrix material is preferably selected from aluminium, magnesium, titanium, iron and combinations, alloys and mixtures thereof. Once moulded and formed into a composite wheel, the face portion comprises a matrix material, such as resin, metal, and fibres.

The fibre layup of the face portion is preferably injection and/or impregnated with a curable matrix material and then cured and/or set. The method therefore preferably further includes the steps of:
 providing a matrix material in contact with pre-moulded structure of the face portion; and
 curing the face portion.

The surface of the shaped preform is preferably activated to allow it to bond with the surrounding material when the matrix material is injected/impregnated. Activation is typically a surface marking procedure, for example, this could be achieved by chemical etch, mechanical abrasion or the like.

The shaped preform is preferably integrally formed with the composite wheel. Moreover, the composite wheel is preferably formed as a unitary body. This typically involves simultaneous injection and/or impregnation of matrix material and then curing, setting or the like of each portion of the composite wheel. In such embodiments, each of the rim portion and the face portion are preferably at least partially uncured at the time when the connection is prepared. The connection portion is preferably integrally formed with the composite wheel. In such embodiments, the method further includes the steps of:
 concurrently providing a matrix material in contact with each rim portion and the face portion of the wheel; and
 co-curing the rim portion and the face portion of the wheel.

It should be appreciated that curing of the matrix material and the associate part such as the face portion, rim portion, unitary composite wheel or similar encompasses curing, setting, drying or similar processes.

Where the matrix material comprises a resin, a variety of resin delivery systems can be used with the method of the second aspect. In some embodiments, at least a part of the resin is provided by Resin Infusion and/or Resin Transfer Moulding and/or Vacuum Assisted Resin Transfer Moulding.

The fibres and fibre elements of the fibre layup of the face portion of the composite wheel preferably comprise carbon fibre fibres. However, again it should be appreciated that a wide variety of fibres may be used in the present invention, including but not limited to fibres selected from the group consisting of carbon fibres, glass fibres, aramid fibres, synthetic fibres such as acrylic, polyester, PAN, PET, PE, PP or PBO-fibres, or the like, bio fibres such as hemp, jute, cellulose fibres, or the like, mineral fibres for example Rockwool or the like, metal fibres for example steel, aluminium, brass, copper, or the like, boron fibres or any combination of these. In a preferred embodiment, the fibres comprise carbon fibres. The fibres may be provided in any desirable orientation in the transition zone like for example unidirectional, biaxial or random or a combination of these. However, the fibres are preferably oriented to reduce the stress between the composite members as well as to strengthen areas of the final structure which will be exposed to a higher stress during service. The orientation of fibres may or may not be the same in all the layers comprising fibres within the transition zone. For example, one or more layers of fibres may be oriented in another manner than other layers, if a stress analysis suggests a multi-axial fibre orientation. However, in other embodiments the fibres may be oriented substantially the same way in all the layers of fibres.

The fibre elements may be provided in any suitable form including in prepregs, semi-pregs, woven or non-woven fabrics, mats, pre-forms, pre-consolidated pre-forms, individual or groups of fibres, tows, tow-pregs, or the like. In embodiments, the fibre elements are provided as at least one fabric sheet, preferably a multi-axial fabric. During lay-up (preparing up to the point before consolidation and/or setting, curing or the like of the matrix material) of a connection, the matrix material need not be comprised in the layers comprising fibres (e.g. a prepreg or semi-preg) or between the layers comprising fibres. However, the matrix material should form a continuous matrix after setting occurs.

The face portion can be formed from tailored fibre preform having a desired shape and fibre orientation which includes the shaped preform of the present invention. The tailored fibre preform is formed having a desired shape and fibre orientation. It is to be understood that a pre-form is a composite material comprising fibres. In some instances the preform may also include an uncured matrix material such as a resin. Some preforms may substantially comprise dry fibres with no matrix material. A binder may be used to assist holding the plies together before the matrix material has been injected.

A third aspect of the present invention provides a composite wheel including a shaped preform according to the first aspect of the present invention. In some embodiments, the composite wheel is formed about a central wheel axis.

A further aspect of the present invention provides a shaped preform component for a spoke portion of a composite wheel, the shaped preform comprising:
an elongate body configured to be located in a spoke of a composite wheel,
wherein the shaped preform component is formed from a cured composite fibre material having a compressibility of <2% volumetric under moulding conditions of 50 bar hydrostatic pressure and a temperature of 60 to 150° C.,
and wherein the density of the cured composite fibre material is selected to be between 0.3 and 3 $g/cm^3$, and preferably from 0.4 to 2 $g/cm^3$.

In some embodiments, the density of the cured composite fibre material is selected to be between 0.3 and 2 $g/cm^3$, and more preferably from 0.4 to 1.8 $g/cm^3$. In some embodiments, the density of the shaped preform is from 0.5 and 1.5 $g/cm^3$. In some embodiments, the density of the shaped preform is from 0.4 and 1.2 $g/cm^3$. In some embodiments, the density of the shaped preform is from 0.8 and 1.6 $g/cm^3$. In some embodiments, the density of the shaped preform is from 0.4 and 1.5 $g/cm^3$. In some embodiments, the density of the shaped preform is from 1.0 and 1.8 $g/cm^3$. In some embodiments, the density of the shaped preform is from 0.4 and 1.0 $g/cm^3$.

It should be appreciated that this further aspect of the present invention can incorporate all the features discussed above in relation to the first aspect of the present invention.

The present invention preferably provides preformed shaped insert for fitment into the fibre layup of the spoke portion a carbon fibre wheel for a vehicle such as cars, trucks, aircraft, buses or the like. The preformed shaped insert can also be used as a reinforcement fibre layup aid for forming the spoke portion of a composite wheel.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

Figure 1:
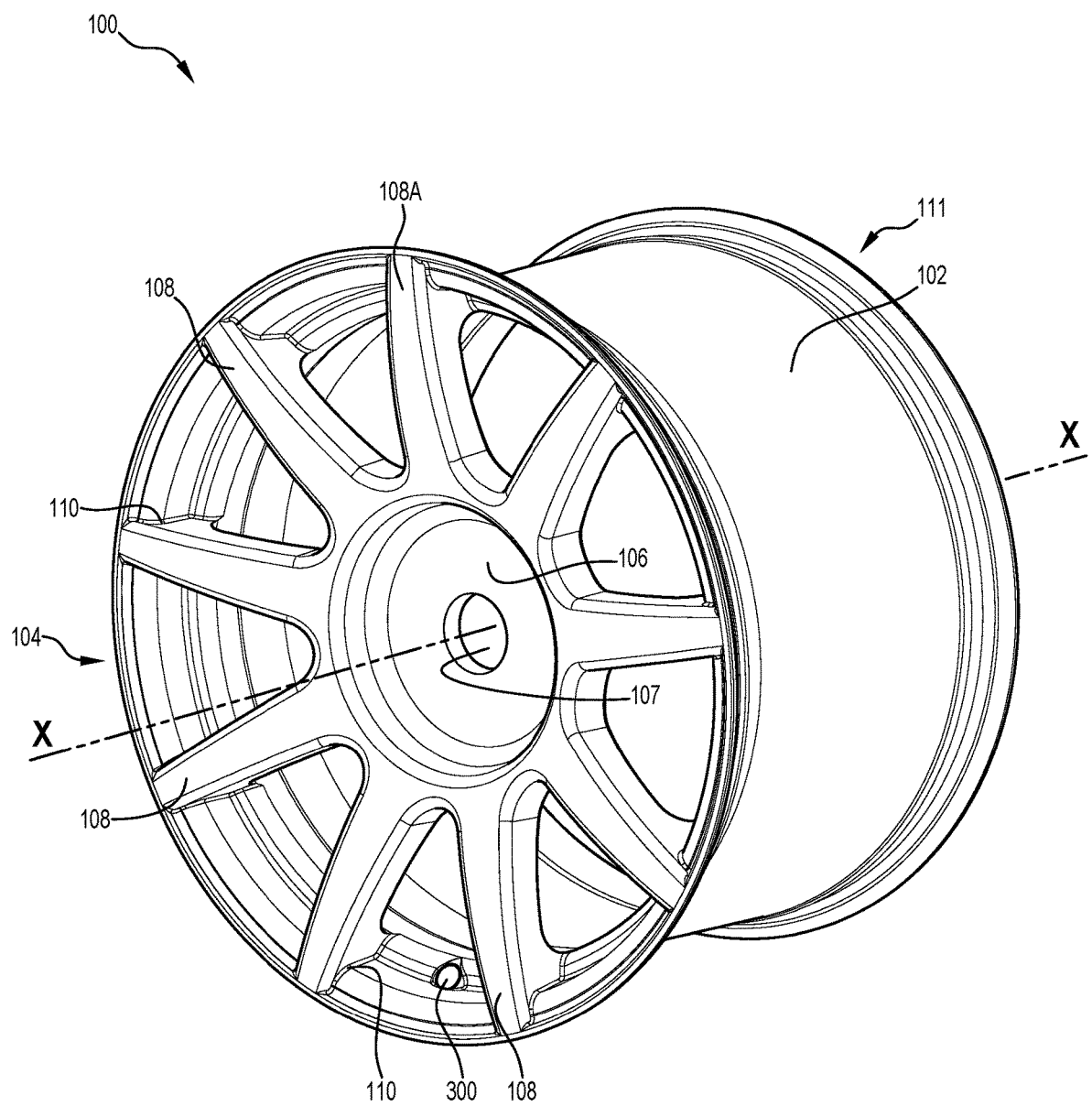
FIG. 1 is a perspective view of a composite wheel including a connection between a face portion and rim portion thereof according to one embodiment of the present invention.

Referring firstly to FIG. 1, there is shown a perspective view of a composite wheel 100 which has been formed and integrally includes the shaped preform 200A of the present invention. The illustrated composite wheel 100 has been developed by the Applicant as a composite wheel formed as a one-piece body. The general process of manufacture of the composite wheel 100 is described in International Patent Publication WO2010/024495A1, the contents of which are to be understood to be incorporated into this specification by this reference.

The illustrated composite wheel 100 includes two main sections:
A). a rim portion 102 comprises an annulus structure onto which a tyre (not illustrated) is mounted; and
B). a face portion 104 comprising a circular hub 106 and a series of spokes 108. The hub 106 includes a central aperture 107 and may also include a number of fastening apertures configured to receive fastening bolts (not illustrated) used to fix the wheel to a wheel mount of a vehicle (not illustrated) or a central lock wheel fastening configuration (again not illustrated) having associated apertures in the hub 106. The spokes 108 comprise elongate arms connected to the hub 106 at one end and the rim portion 102 at another end.

As described in International Patent Publication WO2010/024495A1, the creation of such a one-piece composite wheel 100 necessitates use of a separate rim portion mould (not illustrated) and a face portion mould (not illustrated). In use, the rim portion 102 is formed by laying up a first set of fibres typically embodied in a reinforcement fabric seated in the rim portion mould, and the face portion 104 is formed by separately laying up a second set of fibres, typically embodied in a reinforcement fabric seated in the face portion mould. The rim portion mould includes an inner bucket mould and an outer cylindrical mould. The reinforcement fabric from the rim portion mould and face portion mould are then assembled together in a combined mould, with the separate portions being interconnected at a connection point 110. A final moulding process is then undertaken in which matrix material, such as a resin, is injected and/or infused into the reinforcement of the overall wheel form to produce a moulded single piece wheel 100.

Figure 2:
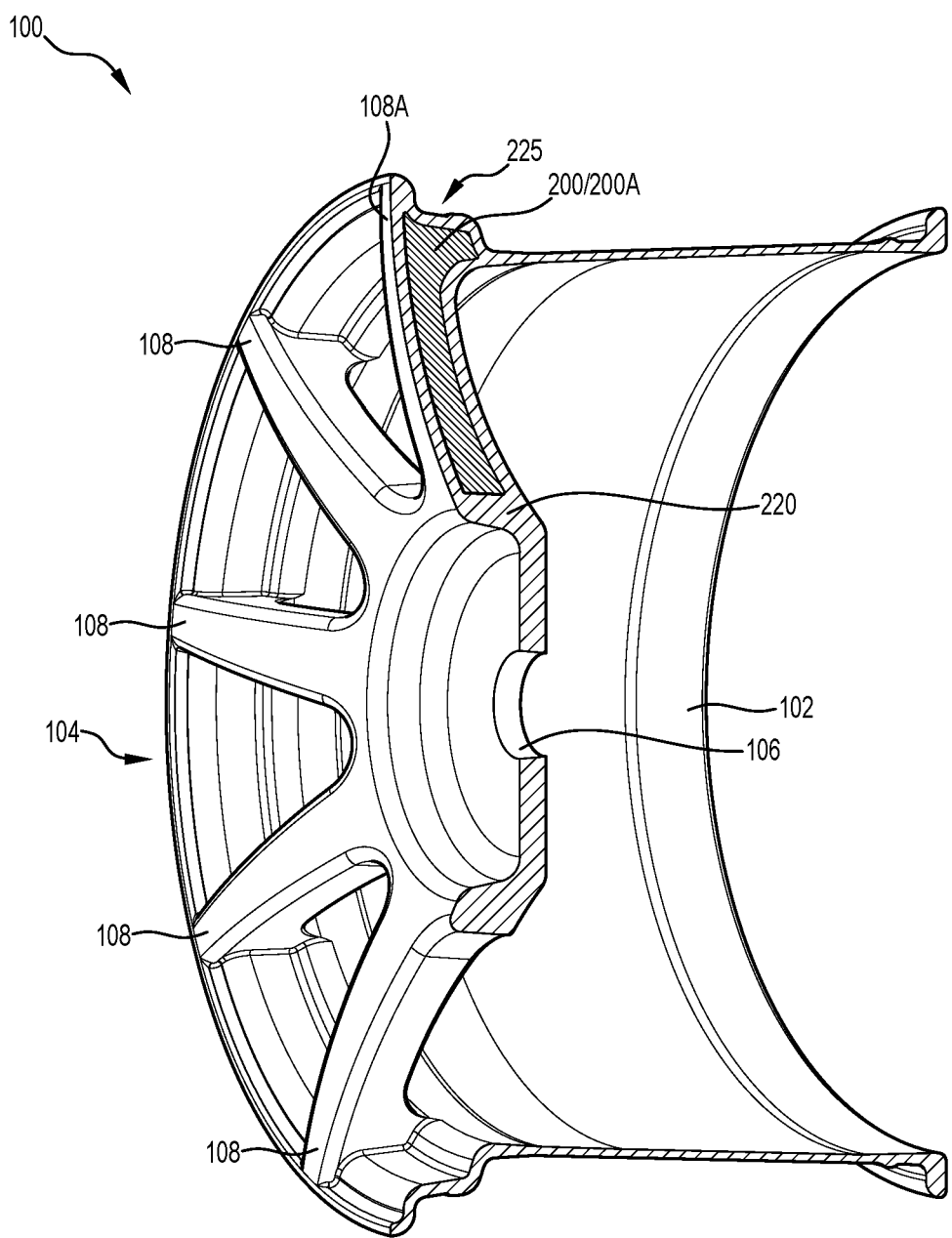
FIG. 2 is a more detailed view of the rim to face connection region of the composite wheel shown in FIG. 1.

The shape and configuration of the face portion 104 can be formed from lay-up in the face portion mould. Shaped inserts can be used in various sections of the face mould to assist the formation of features of the face portion. One example is the Applicant's co-pending patent applications (claiming priority from provisional patent application No. 2017903324) which teach the use of a shaped preform that is used to assist the formation of the hub portion 106 of a composite wheel 100. Moreover, the spoke portions 108 of the composite wheel 100 have been previously constructed with the aid of a shaped foam insert 200 as generally illustrated in FIG. 2. That foam insert 200 is constructed of a dense foam material such as polyurethane foams, polymethacrylamides, syntactic materials or the like, and is moulded into the desired spoke shape prior to layup of the face portion. The use of foam inserts is possible in spokes as the loading between the wheel hub portion 106 and rim 102 can be transmitted through the walls of the spokes 108 through design of the fibre layup and fibre orientations in those the layup. The foam insert is therefore used as a lightweight core filler material around which the fibre layup can be formed.

The shaped preform 200A (FIGS. 2, 3 and 4) of the present invention is designed as a direct substitute for conventional foam spoke inserts 200. In this way, no special considerations therefore need to be made in wheel manufacturing when using this new shaped preform, as it becomes a direct substitution for the conventional foam core insert in the existing manufacturing process. Just like conventional foam inserts, this composite shaped preform 200 aids the layup, where it is located in the spoke portion 108 in the mould and the layup is formed around the preform 200.

It should be appreciated that one or more of the spokes 108 of a composite wheel 100 can include the shaped preform 200A. In some embodiments, only a select number (typically one or two) of the spoke portions 108 include the shaped preform 200A. The remaining spokes include conventional foam inserts. In some embodiments, all of the spokes include the shaped preform 200A. In these embodiments, the composition and thus density of each shaped preform 200A can be designed and tailored for the particular requirements of each spoke. The composite wheel 100 can then be balanced through density design of the spoke portions 108. However, it should be understood that number of foam inserts 200 and shaped preforms 200A can be mixed and matched to suit a particular application and/or economics.

Figure 3:
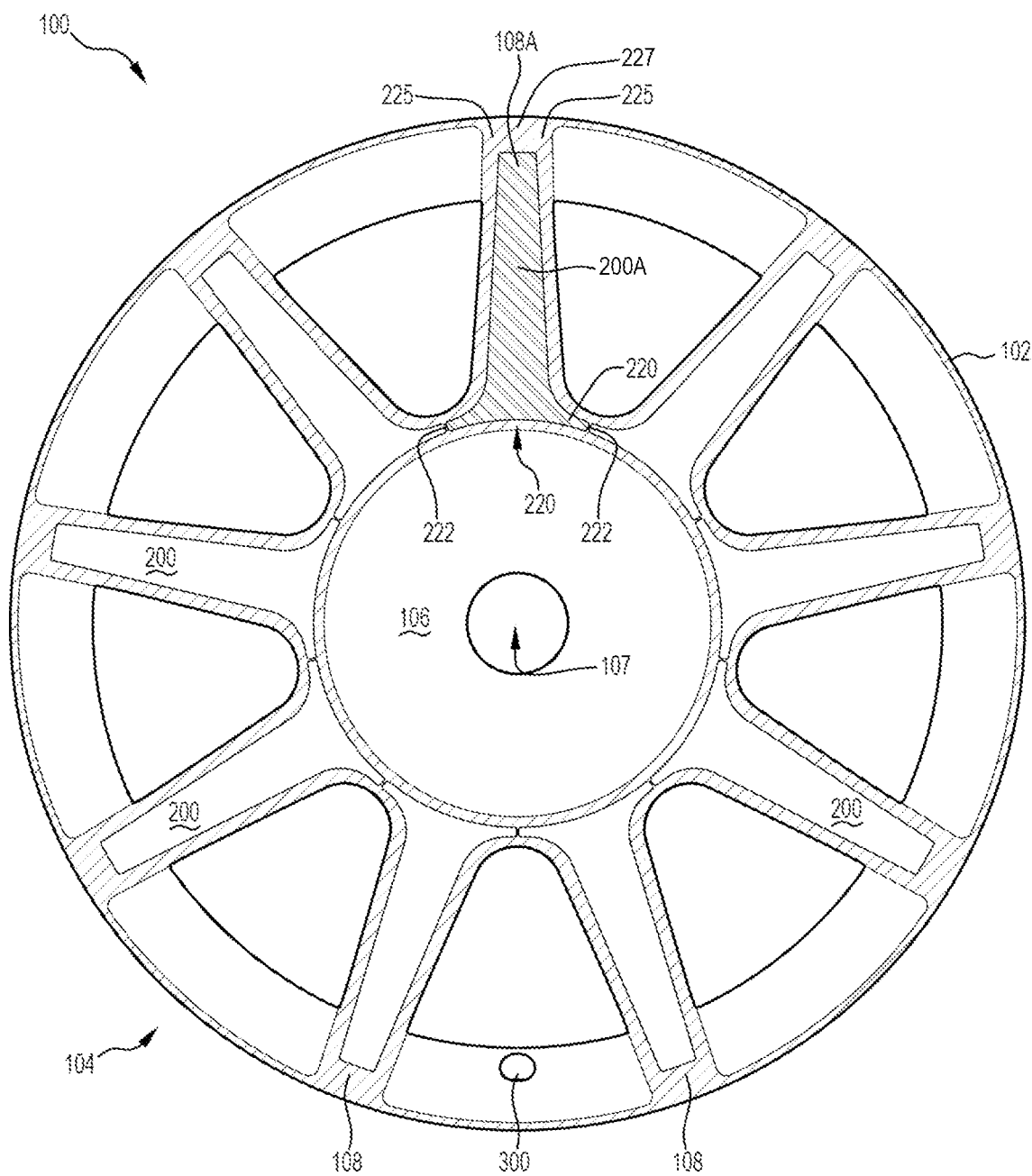
FIG. 3 provides a front cross-sectional view of the composite wheel shown in FIGS. 1 and 2.

In a preferred embodiment shown in FIG. 3, a single spoke 108A of a composite wheel 100 can include the shaped preform 200A. The remaining spokes include conventional foam inserts 200. That spoke is located generally radially opposite to a TPMS valve 300 mounting location on the composite wheel 100. As will be explained in greater detail below, the density of the shaped preform 200A can then be designed to provide a counterbalance for a TPMS valve 300 fitted to that composite wheel 100.

However, whilst the shaped preform 200A is shown in FIGS. 2 and 3 as occupying the entire core volume of the spoke 108A, it can in other embodiments occupy only a portion of the core volume of a spoke 108A for the counterbalance function. Where the shaped preform component occupies a portion of the volume of the spoke, another preform for example a foam component may be used in conjunction with the invention to fill that volume.

Figure 4:
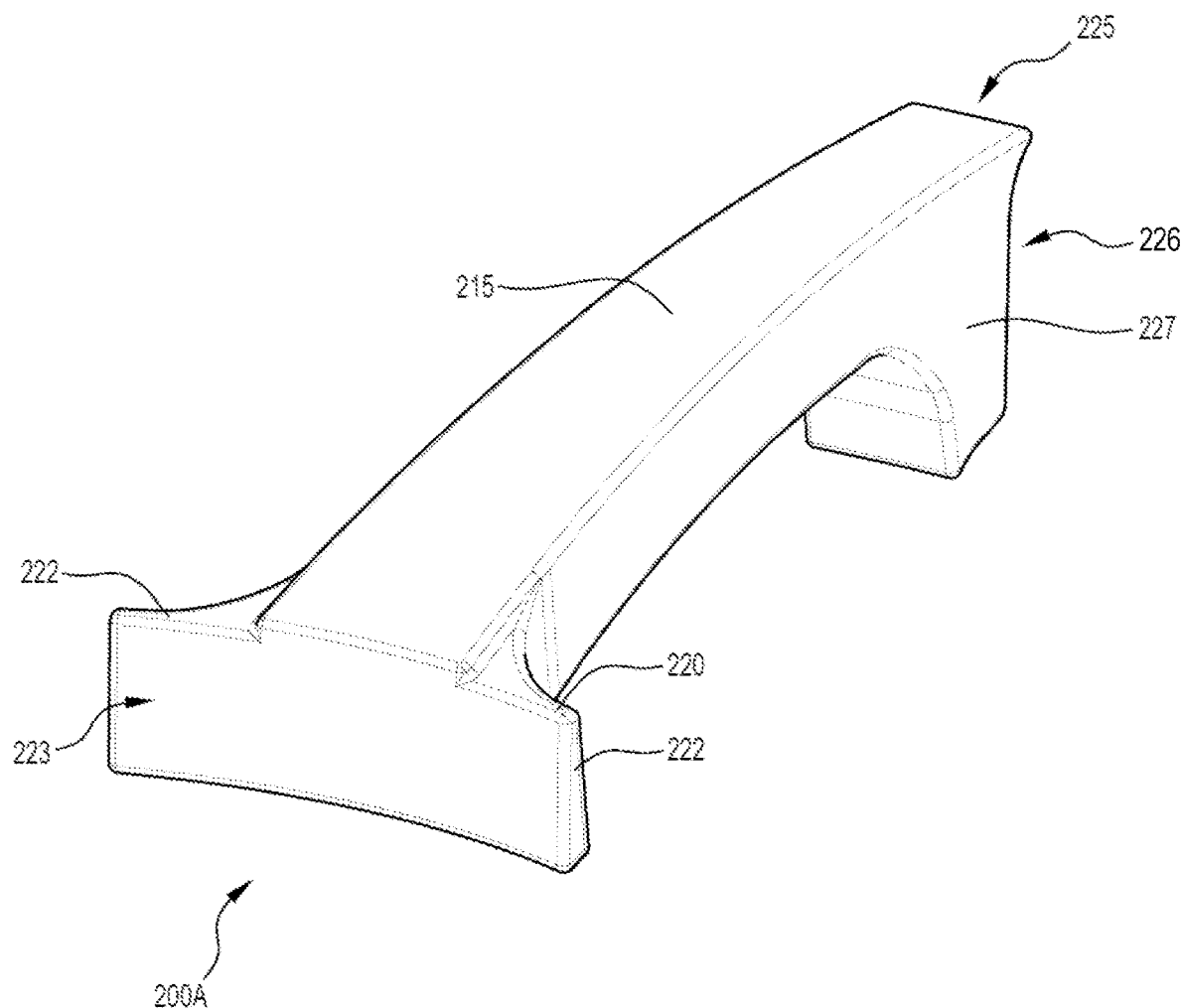
FIG. 4 provides an isometric top view of a shaped preform according to an embodiment of the present invention.

FIGS. 3 and 4 show one example of a shaped preform insert 200A for use in the layup and formation of a face portion 104 of a composite wheel 100 such as shown in FIGS. 1 and 2. The illustrated shaped preform 200A is used to provide the shape and configuration of the spoke 108 connections of that face portion 104. Thus, the illustrated shaped preform 200A comprises an elongate body 215 that extends between the hub 106 and rim 102 of the composite wheel 100. The shaped preform 200A has a generally cuboid or rectangular box main body defining a shaft that extends between the hub 106 and rim 102. The hub end 220 includes two arms 222 which extend laterally outwardly of that end 220 to produce a T-shaped connection portion for engagement with the outer side of the hub 106. The hub 106 has a generally circular outer configuration. Therefore, these arms 222 and end face have a curved outer side 223 substantially matching the circumferential curve of that outer side of the hub 106. The rim end 225 includes axial flange/leg 227 which extends downwardly (relative to the orientation of the shaped preform 200A shown in FIG. 4) to form an L-shaped end. The flange 227 is configured to extend along the rim 102 towards the mounting side or inner side 111 (FIG. 1) of the composite wheel 100. The outer side 226 of the end face of rim end 225 is contoured to substantially matching the curved of that outer side of the rim 102.

Nevertheless, it should be appreciated that the exact geometric configuration of the shaped preform 200 depends on the intended configuration of the hub 106 of the composite wheel 200 and intended shape and configuration of the spoke portion 108. For example, the number of spokes 108 can vary, affecting the shape and size of each spoke portion 108. The desired configuration of each spoke portion 108 may vary for ascetic purposes, and may incorporate a desired pattern, indicia, and/or geometry—for example a desired complex geometry.

Whilst not illustrated, the shaped preform 200 could be shaped/configured to include a number of additional features designed to assist subsequent formation and layup of a face portion of a composite wheel. These features include (but are not limited to): fibre ply retention formations such as steps, recesses, slots or the like; guide lines to visually indicate the location that the edges of a ply should be located; or holding/manipulation formations for optimising handling of the shaped preform such as recesses, flanges, apertures, ribs, hooks, protrusions or the like.

The shaped preform 200 is designed to have a tailored density selected to counterbalance a mass addition to that composite wheel 100. One particular example is as a counterbalance for a TPMS valve 300 (FIG. 1) fitted to the composite wheel 100.

In order to act as a counterbalance to the added mass, the mass and moment imbalance created by the mass addition (moment and mass balancing about the center X-X of the composite wheel 100) must be determined. The shaped preform 200 is then designed to be located in a position that counterbalances the mass and moment of the mass addition, for example in a located substantially radially opposite to the location of the mass addition about the central axis X-X of the face portion 104 of the composite wheel 100. The mass, and thus density of the shaped preform 200 is then tailored to provide the correct counterbalance mass for the position of that shaped preform relative to the mass addition about the central axis X-X. The density of the shaped preform 200 can be varied through material selection of the filling composition of the shaped preform 200 (as discussed below).

The shaped preform 200 is formed from a cured composite fibre material having a compressibility of <2%, preferably <1% volumetric under moulding conditions of 50 bar hydrostatic pressure at process temperatures of from 60 to 150° C., preferably 60 to 140° C. By cured, it is to be understood that the cured composite fibre material has undergone at least a partial curing process to harden or cure a curable matrix material, such as a resin, in that composite fibre material. The cured composite fibre material provides structural rigidity and/or solidity to the preform providing limited compressibility to enable the provision of an appropriate volume and minimal volume change during layup and moulding of the face portion of the composite wheel.

Whilst not wishing to be limited by any one theory, the shaped preform 200 is designed to provide a core material that can be used in layup and curing process of a composite wheel 100. The mechanical and material properties of the shaped perform are also selected to minimise structural loading and stresses resulting from material incompatibility and volume change during layup, curing and post cure processes when forming a composite wheel.

The mechanical properties of the shaped preform 200 are designed to obtain optimal mechanical and material performance. A shaped preform 200 with insufficient tensile modulus in the thickness direction of the body will be ineffective at unloading the flange to sidewall connection and hence be of little structural value. Whereas a shaped preform 200 with excessive tensile modulus in the thickness direction of the body will lead to excessive through thickness stress in the flange as it attempts to separate from the shaped preform 200 and result in failure within the flange itself or at the connection between flange and shaped preform 200. An appropriately designed shaped preform 200 will unload the flange to sidewall connection without creating excessive through thickness stress in the flange.

Any number of different composite fibre material could be used which include or can be bound by a curable matrix material, for example a resin to form the cured composite fibre material of a selected or desired density suitable to counterbalance the mass addition to the composite wheel 100. Density variation is achieved through careful selection of the composition of the shaped preform 200. In some embodiments, the shaped preform is formed from resin (pure resin) or is substantially formed from resin only. In embodiments, the shaped preform is formed from at least one of: Tailored Fibre Placement plies or preforms; One or more layers of Single fibre direction plies (Unidirectional); One or more layers of multi directional fibre plies (e.g. stitched Non-crimp fabric); or Fibre Patch Placement (FPP) preforms e.g. CEVOTECH technology; Non-woven, isotropic or anisotropic fibre layers e.g. RECATEX Recycled Carbon Fiber Nonwovens; Isotropic fibre arrangement; Fillers; Glass microspheres; hydrophobic fumed silica; epoxy resin/hardener; phenolic resin; milled carbon fibre; comminuted carbon fibre (for example chopped or cut carbon fibre), or a combination thereof.

In preferred forms the shaped preform component is formed from:

(i) a mixture of resin, milled carbon fibre or comminuted carbon fibre and hollow glass microspheres.

(ii) a mixture of resin and milled carbon fibres.

(iii) a mixture of resin and comminuted carbon fibre, preferably chopped carbon fibre.

It should be appreciated that the resin also includes a content of hardener. Each of (i) (ii) and (iii) can optionally include 1 to 5 wt %, preferably 1 to 2 wt % hydrophobic fumed silica.

The milled carbon fibres have a length of <500 micron length, preferably less than 100 micron. For example, a milled carbon fibre of 100 micron length could be used such as Carbiso™ MF. However, it should be appreciated that any brand of milled carbon fibre could be suitable. Other fibre types of similar length could be used.

In other embodiments, a comminuted carbon fibre can be used, for example a chopped carbon fibre. This comminuted carbon fibre can have a length less than 20 mm, preferably less than 15 mm, more preferably between 1 and 15 mm. For example, a comminuted carbon fibre of about 12 mm length could be used. Other fibre types of similar length could be used.

One preferred material is provided as Options A to F below in Table 1 (ratios are in parts per mass):

TABLE 1

Example shaped preform compositions

| Mix Ratio by parts | Mixed Resin & Hardener | Milled Carbon Fibre | Comminuted Carbon Fibre | Hollow Glass Microspheres | Solid Ceramic Microspheres | Theoretical Density (g/cc) |
| --- | --- | --- | --- | --- | --- | --- |
| Option A | 100 | 0 | 0 | 100 | 0 | 0.45 |
| Option B | 300 | 0 | 0 | 110 | 0 | 0.63 |
| Option C | 375 | 100 | 0 | 56 | 0 | 0.91 |
| Option D | 100 | 0 | 0 | 0 | 0 | 1.14 |
| Option E | 200 | 100 | 0 | 0 | 0 | 1.30 |
| Option F | 100 | 0 | 0 | 0 | 200 | 1.79 |
| Option G | 200 | 0 | 100 | 0 | 0 | 1.30 |

In more detail, option C can comprise:

3.75 parts epoxy resin;

1 part milled carbon fibre of 100 micron length; and 0.56 parts hollow glass microspheres.

In more detail, option G can comprise:

2 parts epoxy resin and hardener; and 1 part chopped carbon fibre of 12 mm length.

Each of the above options can optionally include 1 to 5 wt %, preferably 1 to 2 wt % hydrophobic fumed silica. It should be appreciated that alternative mix ratios to those provided in Option A to F above may also provide a satisfactory composition and tailored density for the shaped preform. The ratios indicated in the table could therefore be changed to alter the density of the shaped preform to provide a desired mass, thereby tailoring the density and mass of the preform to a particular application.

The microspheres used in the above compositions comprise 3M S28HS glass bubbles available from 3M Advanced Material Division. These glass bubbles comprise hollow spheres with thin walls made from Soda-lime-borate-silicate glass having an average diameter of 30 micron and a crush strength (90% survival by volume) of 3000 psi and a true density of 0.28 gram per cc. However, it should be appreciated that other similar microspheres could also be used. For example, alternative hollow microspheres such as the 3M K1 bubble having a 250 PSI target crush strength and 0.125 gram per cc true density) or 3M IM30K (or similar) that has a crush strength of 28000 psi and a true density of 0.60 g/cc could be used. A selection of possible 3M microspheres that can be used are provided in Table 2:

TABLE 2

3M Hollow Glass Microspheres (Glass Bubbles) that may also be used in the present invention:

| | Target Crush Strength (90% survival, psi) | True Density | Typical Particle Size (microns, by volume) Distribution | | | Colour (unaided eye) |
|---|---|---|---|---|---|---|
| | | | 10th % | 50th % | 90th % | |
| K1 | 250 | 0.125 | 30 | 65 | 115 | white |
| K15 | 300 | 0.15 | 30 | 60 | 105 | white |
| S15 | 300 | 0.15 | 25 | 55 | 90 | white |
| S22 | 400 | 0.22 | 20 | 35 | 65 | white |
| K20 | 500 | 0.20 | 25 | 55 | 95 | white |
| K25 | 750 | 0.25 | 25 | 55 | 90 | white |
| S32 | 2000 | 0.32 | 20 | 40 | 7 | white |
| S35 | 3000 | 0.35 | 10 | 40 | 75 | white |
| K37 | 3000 | 0.37 | 20 | 45 | 80 | white |
| XLD3000 | 3000 | 0.23 | 15 | 30 | 40 | white |
| S38 | 4000 | 0.38 | 15 | 40 | 75 | white |
| S38HS | 5500 | 0.38 | 15 | 40 | 75 | white |
| S38XHS | 5500 | 0.38 | 15 | 40 | 70 | white |
| K46 | 6000 | 0.46 | 15 | 40 | 70 | white |
| K42HS | 7500 | 0.42 | 11 | 22 | 37 | white |
| S60 | 10000 | 0.60 | 15 | 30 | 55 | white |
| S60HS | 18000 | 0.60 | 11 | 30 | 50 | white |
| iM16K | 16000 | 0.46 | 12 | 20 | 30 | white |
| iM30K | 28000 | 0.60 | 9 | 16 | 25 | white |

In an exemplary embodiment, the shaped preform component is formed from a mixture of ratio (parts by mass) of 3.75:1:0.56 mixed Resin:Milled carbon fibre:Hollow Glass Microspheres.

In the illustrated embodiment, the fibres in the cured composite fibre material of the composite wheel 100 comprise carbon fibres. However, it should be appreciated that a wide variety of fibres may be used in the present invention, including but not limited to fibres selected from the group consisting of carbon fibres, glass fibres, aramid fibres, synthetic fibres such as acrylic, polyester, PAN, PET, PE, PP or PBO-fibres, or the like, bio fibres such as hemp, jute, cellulose fibres, or the like, mineral fibres for example Rockwool or the like, metal fibres for example steel, aluminium, brass, copper, or the like, boron fibres or any combination of these.

It should be appreciated that the thermal expansion properties of the shaped preform 200 are designed to be similar to and preferably substantially match the thermal properties of the overall composite material of the face portion of a composite wheel that the shaped preform 200 is configured to be included therein. Matching thermal expansion properties avoid damage such as delamination of the parts (shaped preform and the surrounding laminated material in post cure processes).

The composite material (typically a carbon fibre laminate) that is formed adjacent to the shaped preform during the moulding process must adhere to the shaped preform. The shaped preform material type must enable this, for example the shaped preform can use epoxy resin but typically should not use Polypropylene. After moulding of the shaped preform, and prior to layup of the shaped preform, the shaped preform surface must be activated to allow it to bond with the subsequent injection operation—this could be achieved by chemical etch, mechanical abrasion or the like.

Other mechanical properties of the shaped preform 200 of interest include:

Density—preferably between 0.3 and 3 g/cm$^3$, preferably between 0.3 and 2 g/cm$^3$, and more preferably from 0.4 to 1.8 g/cm$^3$. In some embodiments, the density of the shaped preform is from 0.5 and 1.5 g/cm$^3$;

Tensile Strength—which is preferably between 20 and 80 MPa, more preferably from 20 and 60 MPa;

Stiffness—which is preferably from 1.5 to 30 GPa, preferably from 5 to 30 GPa, more preferably from 8 to 30 GPa, yet more preferably 10 to 25 GPa. In some embodiments, the stiffness is from 1.5 to 10 GPa. In other embodiments, the stiffness is from 8 to 25 GPa.

However, it should be appreciated that these may vary depending on the material, wheel configuration and desired properties of a specific composite wheel.

The illustrated shaped preform 200 is formed by a standard composite moulding process. In this process, the preferred material composition described above in Table 1 is metered and mixed and then injected into a closed, heated mould. The mould is at 120° C. and once filled, the mould is held at 120° C. for 10 minutes to cure the resin. It should however be appreciated that other process temperatures could be used depending on the desired process parameters. The formed shaped preform is then demoulded and moved to the surface preparation step. The cooperatively shaped mould has a mould cavity shaped to provide the desired shape and configuration of the shaped preform 200. Suitable matrix material can be selected from (but are not limited to) a resin based on unsaturated polyester, polyurethane, polyvinyl ester, epoxy, thermoplastics, or combinations thereof.

The curing step can be controlled to provide the desired mechanical properties, including stiffness, surface properties and compressibility. The mechanical properties of the shaped preform 200 can therefore be designed to suit a particular application. However, it must be appreciated that the shaped preform 200 is cured and otherwise processed to provide a selected compressibility that provides minimum volumetric change in subsequent fibre layup and moulding processing steps forming the face portion 104 of the composite wheel 200.

As noted above, the cured shaped preform 200 is used as a layup aid or insert in the layup of the face portion 104 of a composite wheel 100. In this process, the shaped preform 200 is located in the spoke portion 108 of the fibre layup of a face portion mould; and the composite fibre elements of the face portion 104 are laid up around the shaped preform 200 thereby forming a pre-moulded structure of the face portion of a composite fibre wheel.

Again, the fibres elements of the face portion layup may be provided in any suitable form including in prepregs, semi-pregs, woven or non-woven fabrics, mats, pre-forms, pre-consolidated pre-forms, individual or groups of fibres, tows, tow-pregs, or the like. During lay-up, a matrix material, such as a resin need not be comprised in the layers comprising fibres or between the layers comprising fibres. However, the matrix material should form a continuous matrix after curing.

The illustrated composite wheel 100 (FIGS. 1 and 2) is intended to be formed as a unitary body. This involves simultaneous injection and/or impregnation of a matrix material, which in the exemplary embodiment is a resin, into all parts including the rim portion 102, and face portion 104 and then curing of each of the portions of the composite wheel 100. The resin used is preferably epoxy-based. However, it should be understood that any suitable resin can be used for example unsaturated polyester, polyurethane, polyvinyl ester, epoxy, thermoplastics, similar chemical compounds or combinations thereof. A variety of resin delivery systems can be used including, but not limited to Resin Infusion and/or Resin Transfer Moulding and/or Vacuum Assisted Resin Transfer Moulding.

In constructing a composite wheel illustrated in FIGS. 1 and 2, the wheel includes three main mould faces. Firstly, a face mould, which is generally radially orientated relative to the axis of rotation of the wheel X-X. Secondly, an inner bucket mould face, which forms the inside face of the wheel 140 (FIG. 2). The inner bucket mould face includes a front face forming the back mould wall of the face portion which is radially orientated relative to the axis of rotation of the wheel X-X and side walls forming the back mould wall of the rim portion that are axially aligned to the axis of rotation of the wheel X-X. Thirdly, the rim moulds are substantially axially aligned to the axis of rotation of the wheel X-X.

In use, the rim portion 102 and face portion 104 are laid up with reinforcement and then a connection between the rim portion 102 and face portion 104 is laid up with reinforcement. After forming the connection, a resin is injected and/or impregnated into the reinforcement of each of the rim portion 102, the face portion 104 of the wheel 100 and then allowed to cure.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A shaped preform component for a spoke portion of a composite wheel, the shaped preform comprising:
    an elongate body configured to be located in the spoke portion of a composite wheel,
    wherein the shaped preform component is formed from a cured composite fibre material having a compressibility of <2% volumetric under moulding conditions of 50 bar hydrostatic pressure and a temperature of 60 to 150° C.,
    and wherein the density of the cured composite fibre material is selected to form a counterbalance mass for a mass addition to the composite wheel.

2. The shaped preform component according to claim 1, wherein the mass addition comprises a valve.

3. The shaped preform component according to claim 1, wherein the compressibility of the shaped preform is <1% volumetric under moulding conditions of 50 bar hydrostatic pressure.

4. The shaped preform component according to claim 1, wherein the shaped preform has a density of between 0.3 to 3 g/cm$^3$.

5. The shaped preform component according to claim 1, wherein the shaped preform has at least one of:
    Tensile Strength of between 20 to 80 MPa;
    Stiffness from 1.5 to 30 GPa.

6. The shaped preform component according to claim 1, wherein the surface of the shaped preform has a roughened surface having a roughness of at least Ra=0.2 μm.

7. The shaped preform component according to claim 1, wherein the shaped preform is formed from: at least one layer of non-woven, isotropic or anisotropic fibres; an isotropic fibre arrangement; an orthotropic fibre arrangement; fillers; glass microspheres; ceramic microspheres; barium sulfate; hydrophobic fumed silica; epoxy resin/hardener; phenolic resin; milled carbon fibre; comminuted carbon fibre, or a combination thereof.

8. The shaped preform component according to claim 7, wherein the shaped preform further includes 1 to 5 wt % hydrophobic fumed silica.

9. The shaped preform component according to claim 7, wherein the shaped preform further includes 1-2 wt % hydrophobic fumed silica.

10. The shaped preform component according to claim 7, wherein the milled carbon fibres have a length of <500 micron length.

11. The shaped preform component according to claim 1, wherein the shaped preform is formed from:
    (i) a mixture of resin, milled carbon fibre and hollow glass microspheres;
    (ii) a mixture of resin, comminuted carbon fibre and hollow glass microspheres;
    (iii) a mixture of resin, and hollow glass microspheres;
    (iv) a mixture of resin and milled carbon fibres;
    (v) a mixture of resin and comminuted carbon fibres;
    (vi) a mixture of resin, milled carbon fibre and solid ceramic microspheres;
    (vii) a mixture of resin, comminuted carbon fibre and solid ceramic microspheres;
    (viii) a mixture of resin and solid ceramic microspheres; or
    (ix) substantially resin only.

12. The shaped preform component according to claim 1, further comprising a curable matrix material enveloping the comprising components of the shaped preform, wherein the matrix material comprises a resin based on unsaturated polyester, polyurethane, polyvinyl ester, epoxy, thermoplastics, or combinations thereof.

13. The shaped preform component according to claim 1, having thermal properties designed to substantially match the thermal properties of the overall composite material of the spoke portion of the composite wheel that the shaped preform is configured to be included therein.

14. The shaped preform component according to claim 1, wherein the shaped preform comprises an incomplete or under-cured preform.

15. The shaped preform component according to claim 1, comprising a generally cuboid body.

16. The shaped preform component according to claim 15, comprising at least two arms extending laterally outwardly of one end of the cuboid body.

17. The shaped preform component according to claim 15, comprising at least one L-shaped end extending axially outwardly of one end of the cuboid body.

18. The shaped preform component according to claim 1, wherein the shaped preform is integrally formed with the composite wheel.

19. A method of forming a face portion of a composite wheel, comprising:
    locating the shaped preform according to claim 1 in the spoke portion of a fibre layup of the face portion of the composite wheel in a position suitable to balance a mass addition about the central axis of the face portion of the composite wheel; and
    laying up composite fibre elements around the shaped preform thereby forming the pre-moulded structure of the spoke portion of the composite wheel.

20. A composite wheel including the shaped preform according to claim 1.

* * * * *